United States Patent
Oh

(10) Patent No.: US 11,483,057 B2
(45) Date of Patent: Oct. 25, 2022

(54) BASE STATION SIGNAL MATCHING DEVICE, AND BASE STATION INTERFACE UNIT AND DISTRIBUTED ANTENNA SYSTEM INCLUDING THE SAME

(71) Applicant: SOLiD, INC., Seongnam-si (KR)

(72) Inventor: Yung Keun Oh, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 191 days.

(21) Appl. No.: 16/144,495

(22) Filed: Sep. 27, 2018

(65) Prior Publication Data

US 2019/0028178 A1 Jan. 24, 2019

Related U.S. Application Data

(63) Continuation of application No. PCT/KR2016/003300, filed on Mar. 31, 2016.

(30) Foreign Application Priority Data

Mar. 28, 2016 (KR) .................. 10-2016-0036726

(51) Int. Cl.
*H04B 7/155* (2006.01)
*H04B 7/26* (2006.01)
(Continued)

(52) U.S. Cl.
CPC .............. *H04B 7/155* (2013.01); *H04B 7/26* (2013.01); *H04W 40/22* (2013.01); *H04W 88/085* (2013.01)

(58) Field of Classification Search
CPC ....... H04B 7/155; H04B 7/26; H04W 88/085; H04W 40/22
See application file for complete search history.

(56) References Cited

U.S. PATENT DOCUMENTS 8,588,614 B2 * 11/2013 Larsen ............. H04B 10/25754
398/115
9,179,501 B2 * 11/2015 Ko ..................... H04W 88/085
(Continued)

FOREIGN PATENT DOCUMENTS

KR 10-2014-0026321 3/2014
KR 10-2014-0026321 A 3/2014
(Continued)

OTHER PUBLICATIONS

Notice to Submit Response for 10-2016-0036726 dated Mar. 28, 2016.
(Continued)

*Primary Examiner* — Christopher P Grey
(74) *Attorney, Agent, or Firm* — Sughrue Mion, PLLC

(57) ABSTRACT

Provided are a base station signal matching device, and a base station interface unit and a distributed antenna system including the base station signal matching device. The base station signal matching device included in a distributed antenna system receiving a base station signal from at least one base station and transmitting the base station signal to at least one user terminal includes: a signal matching unit receiving a first base station signal from a corresponding base station and matching the first base station signal to be suitable for signal processing of the distributed antenna system; and a signal processing unit receiving the matched first base station signal from the signal matching unit, receiving a matched second base station signal from another base station signal matching device, and combining the matched first base station signal with the matched second base station signal.

6 Claims, 5 Drawing Sheets

(51) Int. Cl.
*H04W 88/08* (2009.01)
*H04W 40/22* (2009.01)

(56) References Cited

U.S. PATENT DOCUMENTS

| | | | |
|---|---|---|---|
| 9,572,178 B1* | 2/2017 | Seo | H04B 1/40 |
| 2007/0147525 A1* | 6/2007 | Song | H04L 27/2647 |
| | | | 375/260 |
| 2009/0061921 A1* | 3/2009 | Eom | H04B 7/0617 |
| | | | 455/522 |
| 2011/0165852 A1* | 7/2011 | Furukawa | H04W 52/24 |
| | | | 455/226.2 |
| 2012/0039254 A1* | 2/2012 | Stapleton | H03F 1/3247 |
| | | | 370/328 |
| 2012/0155884 A1* | 6/2012 | Han | H04B 10/25754 |
| | | | 398/115 |
| 2014/0072299 A1* | 3/2014 | Stapleton | H04B 10/25754 |
| | | | 398/67 |
| 2014/0233435 A1 | 8/2014 | Ko | |
| 2014/0314002 A1* | 10/2014 | Hanson | H04B 1/40 |
| | | | 370/329 |
| 2015/0087329 A1* | 3/2015 | Stratford | H04W 64/00 |
| | | | 455/456.1 |
| 2015/0256358 A1* | 9/2015 | Stapleton | H04W 52/245 |
| | | | 370/329 |
| 2016/0285538 A1* | 9/2016 | Han | H04B 7/155 |
| 2017/0288767 A1* | 10/2017 | Cho | H04B 7/15507 |
| 2018/0219715 A1* | 8/2018 | Park | H04J 11/0069 |
| 2018/0310226 A1* | 10/2018 | Kim | H04W 56/001 |

FOREIGN PATENT DOCUMENTS

| | | |
|---|---|---|
| KR | 10-2015-0072984 A | 6/2015 |
| WO | 2012/024349 A1 | 2/2012 |

OTHER PUBLICATIONS

International Search Report for PCT/KR2016/003300 dated Dec. 14, 2016 [PCT/ISA/210].
Communication issued in the European Patent Office dated Oct. 11, 2019 in corresponding European Application No. 16897141.4-1220.
Communication dated Jul. 22, 2021 from the European Patent Office in Application No. 16897141.4.

\* cited by examiner

BASE STATION SIGNAL MATCHING DEVICE, AND BASE STATION INTERFACE UNIT AND DISTRIBUTED ANTENNA SYSTEM INCLUDING THE SAME

CROSS-REFERENCE TO RELATED APPLICATIONS

This application is a Continuation Stage of PCT International Application No. PCT/KR2016/003300, filed Mar. 31, 2016, and claims priority from Korean Patent Application No. 10-2016-0036726, filed Mar. 28, 2016, the contents of which are incorporated herein by reference in their entireties.

BACKGROUND

1. Field

The present invention relates to a distributed antenna system, and more particularly, to a base station signal matching device for matching a base station signal received from a base station to be suitable for signal processing of a distributed antenna system, and a base station interface unit and a distributed antenna system including the same.

2. Description of the Related Art

A distributed antenna system (DAS), which is an example of a relay system relaying communication between a base station and a user terminal, has been used to extend service coverage of the base station so as to provide a mobile communication service even to a shadow area which inevitably appears either indoor or outdoor environments.

The DAS, after receiving a base station signal from the base station and amplifying the base station signal based on a downlink path, transmits the amplified base station signal to the user terminal in a service area, and amplifies a terminal signal received from the user terminal in the service area based on an uplink path and transmits the amplified terminal signal to the base station. In order to implement such a relay function of the DAS, it is necessary to match signals transmitted and received between the base station and the DAS.

SUMMARY

The present invention is directed to a base station signal matching device capable of reducing the number of ports of a main unit, thereby improving a problem caused by erroneous connection at the time of installation of a distributed antenna system, thereby reducing the installation time and lowering pre-training levels for installers to improve total cost of ownership (TCO), and a base station interface unit and a distributed antenna system including the base station signal matching device.

According to an aspect of the present invention, a base station signal matching device configuring a distributed antenna system receiving a base station signal from at least one base station and transmitting the base station signal to at least one user terminal, the base station signal matching device includes: a signal matching unit receiving a first base station signal from a corresponding base station and matching the first base station signal to be suitable for signal processing of the distributed antenna system; and a signal processing unit receiving the matched first base station signal from the signal matching unit, receiving a matched second base station signal from another base station signal matching device, and combining the matched first base station signal with the matched second base station signal.

According to an example embodiment, the signal processing unit may transmit the combined signals to another base station signal matching device.

According to an example embodiment, the signal processing unit may transmit the combined signals to a main unit.

According to an example embodiment, the signal processing unit may be connected an external management system via a network.

According to another aspect of the present invention, a base station interface unit configuring a distributed antenna system receiving a base station signal from at least one base station and transmitting the base station signal to at least one user terminal, the base station interface unit includes: a base station signal matching device of any one of the above-stated base station signal matching devices.

According to another aspect of the present invention, a distributed antenna system receiving a base station signal from at least one base station and transmitting the base station signal to at least one user terminal, the distributed antenna system includes: a base station signal matching device of any one of the above-stated base station signal matching devices.

According to another aspect of the present invention, a distributed antenna system receiving a base station signal from at least one base station and transmitting the base station signal to at least one user terminal, the distributed antenna system includes: a main unit; and a plurality of base station signal matching devices connected in series to the main unit, wherein the plurality of base station signal matching devices include: a signal matching unit receiving a first base station signal from a corresponding base station and matching the first base station signal to be suitable for signal processing of the distributed antenna system; and a signal processing unit receiving the matched first base station signal from the signal matching unit, receiving a matched second base station signal from another base station signal matching device, and combining the matched first base station signal with the matched second base station signal.

According to another aspect of the present invention, a distributed antenna system receiving a base station signal from at least one base station and transmitting the base station signal to at least one user terminal, the distributed antenna system includes: a main unit; a plurality of first base station signal matching devices connected in series to the main unit; and at least one second base station signal matching device connected in parallel to the main unit, wherein the plurality of first base station signal matching devices include: a signal matching unit receiving a first base station signal from a corresponding base station and matching the first base station signal to be suitable for signal processing of the distributed antenna system; and a signal processing unit receiving the matched first base station signal from the signal matching unit, receiving a matched second base station signal from another first base station signal matching device, and combining the matched first base station signal with the matched second base station signal.

According to the present invention, a plurality of base station signal matching devices connected in series to a main unit to reduce the number of ports of the main unit so as to improve problems caused by erroneous connection at the time of installation of a distributed antenna system, thereby reducing the installation time and lowering pre-training levels for installers to improve total cost of ownership (TCO), and a base station interface unit and a distributed antenna system including the base station signal matching devices may be provided.

DETAILED DESCRIPTION OF EXEMPLARY EMBODIMENTS

Figure 1:
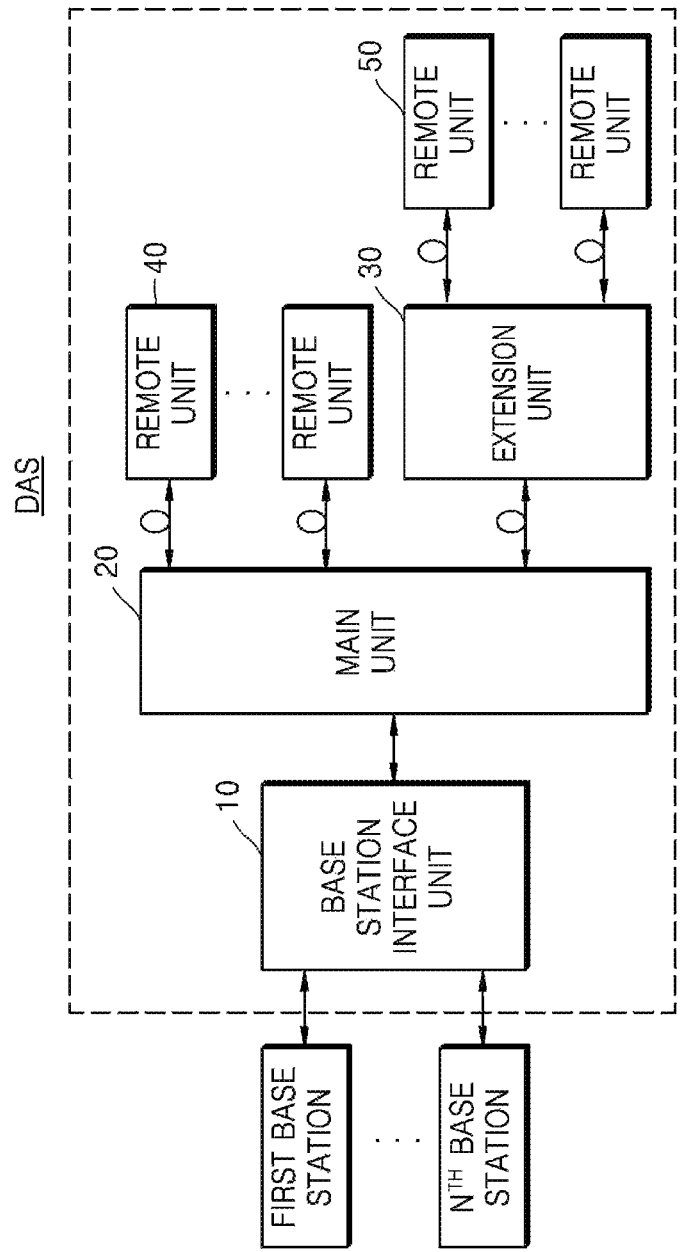
FIG. 1 is a block diagram of a topology of a distributed antenna system to which a base station signal matching device may be applied, according to an embodiment of the present invention.

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention.

In the description of the present invention, certain detailed explanations of the related art are omitted when it is deemed that they may unnecessarily obscure the essence of the present invention. In addition, numeral figures (for example, 1, 2, and the like) used during describing the specification are just identification symbols for distinguishing one element from another element. Further, in the specification, if it is described that one component is "connected" or "accesses" the other component, it is understood that the one component may be directly connected to or may directly access the other component but unless explicitly described to the contrary, another component may be "connected" or "access" between the components. In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among primary functions which the respective components take charge of are exclusively charged by other components to be performed, of course.

A distributed antenna system according to an embodiment of the present invention is a coverage system for an in-building service that delivers voice communication and data communication with high quality and seamlessness. It is also a system for servicing analog and digital telephone systems serviced in multiple bands with one antenna. The distributed antenna system according to an embodiment of the present invention may be installed in general public institutions and private facilities such as a shopping mall, a hotel, a campus, an airport, a hospital, a subway, a sports complex, and a convention center. The distributed antenna system according to an embodiment of the present invention improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building. The distributed antenna system according to an embodiment of the present invention may support the mobile communication standard used worldwide.

For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on. Hereinafter, embodiments of the present invention will be described in detail.

FIG. 1 is a block diagram of a topology of a distributed antenna system to which a base station signal matching device may be applied, according to an embodiment of the present invention.

Referring to FIG. 1, a distributed antenna system DAS may perform a relay function by amplifying a base station signal and transmitting the amplified base station signal to a user terminal (not shown), and by amplifying a terminal signal and transmitting the amplified terminal signal to a base transceiver station (BTS).

In order to perform such a relay function, the distributed antenna system DAS may include a base station interface unit 10 and a main unit 20 constituting a headend node, an extension unit 30 that is an extension node, and a plurality of remote units 40 and 50 that are arranged at each remote service location.

The distributed antenna system DAS may be implemented by an analog distributed antenna system or a digital distributed antenna system, and in some cases may be implemented by a mixed form thereof (i.e., some nodes perform analog processing and the remaining nodes perform digital processing).

However, FIG. 1 shows an example of the topology of the distributed antenna system DAS and the distributed antenna system DAS may be transformed into various topologies considering specificity of installation areas and application fields (e.g., in-building, a subway, a hospital, a stadium, etc.). In this regard, the number of the base station interface unit 10, the main unit 20, the extension unit 30, and the remote units 40 and 50, and a connection relationship between upper and lower ends thereof may be different from those of FIG. 1.

Furthermore, in the distributed antenna system DAS, the extension unit 30 is utilized when the number of branches to be branched from the main unit 20 to a star structure is limited as compared with the number of the remote units 40 and 50 required to be installed. Accordingly, the extension unit 30 may be omitted when the number of the remote units 40 and 50 to be installed may be sufficiently accommodated by only the single main unit 20 or when a plurality of main units 20 are installed.

Hereinafter, nodes in the distributed antenna system DAS and respective functions thereof will be described in more detail.

The base station interface unit 10 may serve as an interface between base stations and the main unit 20 in the distributed antenna system DAS. FIG. 1 shows a case where the base station interface unit 10 is connected to a plurality of base stations (first to $n^{th}$ base stations, where n is a natural number of 2 or more). However, the base station interface unit 10 may be provided for each service provider, each frequency band, and each sector.

In general, since a radio frequency (RF) signal transmitted from a base station is a high power signal, the base station interface unit 10 may adjust a power level of the high power RF signal to be suitable for processing in the main unit 20, and may transmit the RF signal with the adjusted power level to the main unit 20.

A conventional base station interface unit lowers a high power RF signal in each frequency band (or each service provider or sector) and transmits them in parallel to a conventional main unit. However, in a distributed antenna system to which a base station signal matching device according to an embodiment of the present invention may be applied, the base station interface unit 10 combines low power RF signals and transmits the combined signals to the main unit 20.

The conventional main unit combines low power RF signals and distributes the combined signals to conventional remote units. However, in a distributed antenna system to which a base station signal matching device may be applied, according to an embodiment of the present invention, the main unit 20 may distribute combined signals received from the base station interface unit 10 to the remote units 40 and 50 without combining the low power RF signals.

Here, when the distributed antenna system DAS is implemented as a digital distributed antenna system, the base station interface unit 10 may digitize and combine the low power RF signals and transmit them to the main unit 20, and the main unit 20 may distribute the digitized combined signals to the remote units 40 and 50 after performing predetermined signal processing. Alternatively, the main unit 20 may digitize the combined signals received from the base station interface unit 10 and may distribute the digitized combined signals to the remote units 40 and 50 after performing predetermined signal processing on the signals.

A base station signal matching device according to an embodiment of the present invention may be installed in the base station interface unit 10 to adjust a power level of a high power RF signal received from a base station. A base station signal matching device according to an embodiment of the present invention may be provided in the base station interface unit 10 for each frequency band (or each service provider or sector), which will be described in detail later below.

Each of the remote units 40 and 50 may separate the received combined signals by frequency band and perform signal processing (analog signal processing for an analog distributed antenna system (DAS), digital signal processing for digital DAS) such as amplification. Accordingly, each of the remote units 40 and 50 may transmit a base station signal to a user terminal in its service coverage through a service antenna (not shown).

Meanwhile, FIG. 1 shows that a base station and the base station interface unit 10, and the base station interface unit 10 and the main unit 20 are respectively connected to each other through an RF cable, and the main unit 20 and at least one lower node of the main unit 20 are connected to each other through an optical cable. However, a signal transmission medium between each node may vary.

As an example, the base station interface unit 10 and the main unit 20 may be connected to each other through an RF cable, or may be connected to each other through an optical cable or a digital interface. As another example, at least one of between the main unit 20 and the extension unit 30, between the main unit 20 and the remote unit 40, and between the extension device 30 and the remote unit 50 may be connected through an RF cable, a twisted cable, a UTP cable or the like in addition to an optical cable.

However, the following description will be made with reference to FIG. 1. Therefore, in the present embodiment, the main unit 20, the extension unit 30, and the remote units 40 and 50 may include an optical transceiver module for transmitting and receiving optical signals through electrical-to-optical/optical-to-electrical conversion, and may further include a wavelength division multiplexing (WDM) device when nodes are connected to each other by a single optical cable.

Figure 2:
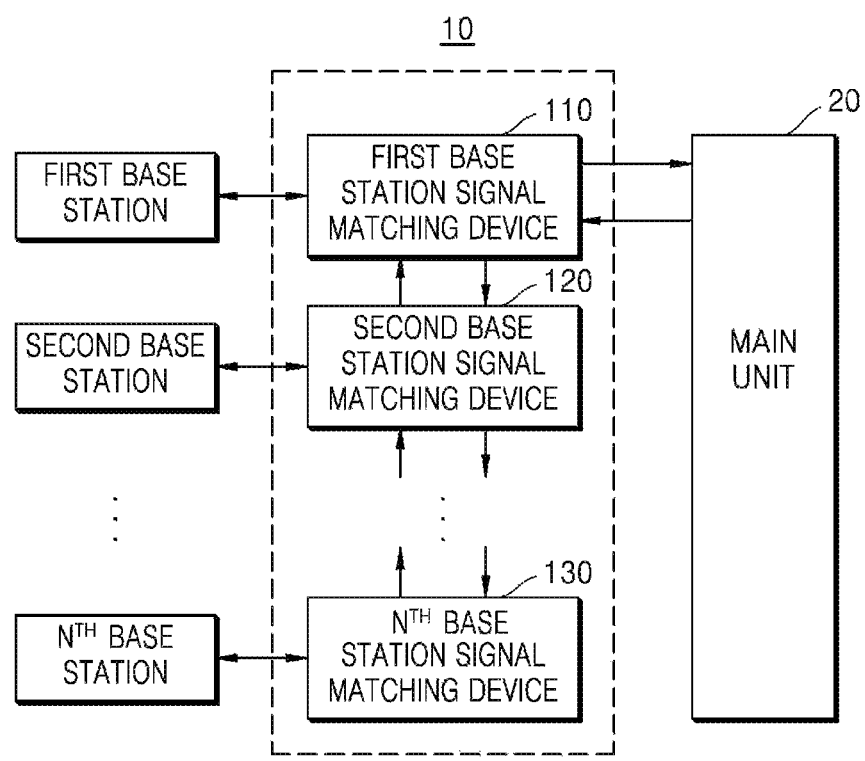
FIG. 2 is a block diagram of a configuration of a base station interface unit shown in FIG. 1.
Figure 3:
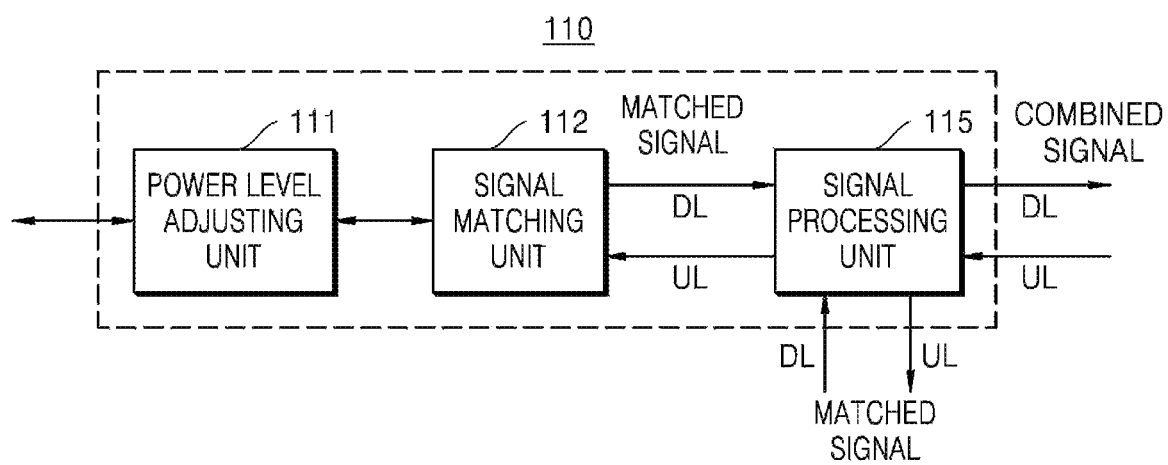
FIG. 3 is a block diagram of a configuration of a base station signal matching device shown in FIG. 2.

FIG. 2 is a block diagram of a configuration of a base station interface unit shown in FIG. 1, and FIG. 3 is a block diagram of a configuration of a base station signal matching device shown in FIG. 2.

Referring to FIG. 2, the base station interface unit 10 may include first to $n^{th}$ base station signal matching devices 110, 120, and 130 respectively connected to corresponding base stations of first to $n^{th}$ base stations.

FIG. 2 shows that each of first to $n^{th}$ base stations transmits a base station signal having a different service frequency band, and the first to $n^{th}$ base station signal matching devices 110, 120, and 130 are provided in the base station interface unit 10 respectively corresponding to the first to $n^{th}$ base stations. However, as described above, each of the first to $n^{th}$ base station signal matching devices 110, 120, and 130 may be provided in the base station interface unit 10 for each sector or each service provider.

In the base station interface unit 10 according to an embodiment of the present invention, the first to $n^{th}$ base station signal matching devices 110, 120, and 130 may be connected in series to the main unit 20 at a rear end. Only one base station signal matching device 110 may be directly connected to the main unit 20 and the remaining base station signal matching devices 120 and 130 are connected to the main unit 20 through the other base station signal matching devices 110 and 120, respectively.

Each of the first to $n^{th}$ base station signal matching devices 110, 120, and 130 may receive a base station signal from a corresponding base station based on a downlink path. The base station signal may be an RF signal and may have high power. Each of the first to $n^{th}$ base station signal matching devices 110, 120, and 130 may match the corresponding base station signal to be suitable for signal processing of the distributed antenna system (in more detail, a signal processing unit, a main unit, and the like). The $n^{th}$ base station signal matching device 130 may transmit the matched base station signal to the other connected base station signal matching device 120. The second to $(n-1)^{th}$ base station signal matching devices 120 may combine internally matched base station signals with base station signals (or combined base station signals) received from the other base station signal matching devices 120 and 130, and may transmit the combined base station signals to the other connected base station signal matching devices 110 and 120. The first base station signal matching device 110 may combine internally matched base station signals with the combined base station signals received from the other base station signal matching devices 120 and 130, and may transmit the combined base station signals to the main unit 20.

Meanwhile, in the above description, it is assumed that each of the n base station signal matching devices 110, 120, and 130 receives an RF type high power signal from a corresponding base station. However, some or all of the n base station signal matching devices 110, 120, and 130 may receive a digital type signal from a device connected thereto. For example, some or all of the n base station signal matching devices 110, 120, and 130 may receive a digital type signal from the device connected thereto using Ethernet or a common public radio interface (CPRI) type. In this case, the other base station signal matching device may convert a received RF type signal into a digital type signal, and then may combine a base station signal received from another base station signal matching device with the converted signal and perform a subsequent operation.

Referring to FIG. 3, the first base station signal matching device 110 may include a power level adjusting unit 111, a signal matching unit 112, and a signal processing unit 115.

The power level adjusting unit 111 adjusts a power level of a base station signal input from a base station based on a downlink path. The power level adjusting unit 111 may include, for example, a coupler, and may adjust the power level of the base station signal by using a power distribution function of the coupler. A coupling ratio of the coupler may vary depending on a required power level.

The power level adjusting unit 111 may adjust a power level of a terminal signal input from the signal matching unit 112 based on an uplink path and transmit the terminal signal to the base station.

The signal matching unit 112 may match the base station signal that has passed through the power level adjusting unit 111 to be suitable for signal processing of the distributed antenna system in the downlink path. The signal matching unit 112 may include, for example, a first filter and a first attenuator based on the downlink path. The first filter may receive the base station signal that has passed through the power level adjusting unit 111. The first filter may have a pass band characteristic corresponding to a service frequency band of the base station signal. The first attenuator may attenuate the base station signal that has passed through the first filter to have a power level suitable for signal processing.

The signal matching unit 112 may match a terminal signal processed by the signal processing unit 115 to be suitable for signal processing of the base station in the uplink path. The signal matching unit 112 may include, for example, a second filter and a second attenuator based on the uplink path. The second attenuator may attenuate the terminal signal to have a power level suitable for signal processing. The second filter may have a pass band characteristic corresponding to a service frequency band of the terminal signal. The first filter and the second filter may be implemented together as a duplexer.

Signal separation in uplink and downlink directions may be made by the first filter and the second filter.

The signal matching unit 112 may further include a power detector to monitor the power level of the base station signal in the downlink path or the power level of the terminal signal in the uplink path.

The signal processing unit 115 may receive the matched base station signal by the signal matching unit 112 in the downlink path. Furthermore, the signal processing unit 115 may receive combined base station signals from another base station signal matching device 120, and may combine the signals. Hereinafter, in order to distinguish a signal transmitted from the base station to the signal processing unit 115 from a signal transmitted from the other base station signal matching device 120 to the signal processing unit 115, the former may be referred to as a 'first base station signal' and the latter may be referred to as a 'second base station signal'. When a distributed antenna system includes a digital distributed antenna system, the signal processing unit 115 may digitize RF type base station signals. The signal processing unit 115 may perform signal processing such as amplification on the base station signals. The signal processing unit 115 may transmit the combined signals to the main unit 20.

The signal processing unit 115 may receive combined terminal signals from the main unit 20 in the uplink path. The signal processing unit 115 may perform signal processing such as amplification on the terminal signals. When the distributed antenna system includes a digital distributed antenna system, the signal processing unit 115 may convert digital type terminal signals into analog signals. The signal processing unit 115 may separate the combined terminal signals by corresponding frequency bands. The signal processing unit 115 may transmit the terminal signals separated by the corresponding frequency bands to the internal signal matching unit 112 or the other base station signal matching device 120.

Although not clearly shown, the second base station signal matching device 120 may be implemented in the same manner as the first base station signal matching device 110 described above. A signal processing unit of the second base station signal matching device 120 may perform a signal combining function in the downlink path and may transmit combined signals to the other base station signal matching devices 110 and 120. The signal processing unit of the second base station signal matching device 120 receives combined terminal signals from the other base station signal matching devices 110 and 120 in the uplink path and may separate the combined terminal signals by corresponding frequency bands.

Although not clearly shown, the $n^{th}$ base station signal matching device 130 may be implemented in the same manner as the first base station signal matching device 110 described above. In this case, a signal processing unit of the $n^{th}$ base station signal matching device 130 may bypass input signals and transmit a base station signal to the other base station signal matching device 120 in the downlink path, and may transmit a terminal signal to an internal signal matching unit. Alternatively, the $n^{th}$ base station signal matching device 130 may not include a signal processing unit unlike the first base station signal matching device 110 described above.

Each of the first to $n^{th}$ base station signal matching devices 110, 120, and 130 may receive a corresponding terminal signal from the main unit 20 in the uplink path. Each of the first to n$^{th}$ base station signal matching devices 110, 120, and 130 may match the corresponding terminal signal to be suitable for signal processing of the base station. The first base station signal matching device 110 may separate the combined terminal signals received from the main unit 20 and transmit some of the separated terminal signals to another connected base station signal matching device 120. The second to (n−1)$^{th}$ base station signal matching device 120 may separate the combined terminal signals received from the other base station signal matching devices 110 and 120 and transmit some of the separated terminal signals to other connected base station signal matching devices 120 and 130. The first to n$^{th}$ base station signal matching devices 110, 120 and 130 may transmit the terminal signals to corresponding base stations, respectively.

Figure 4:
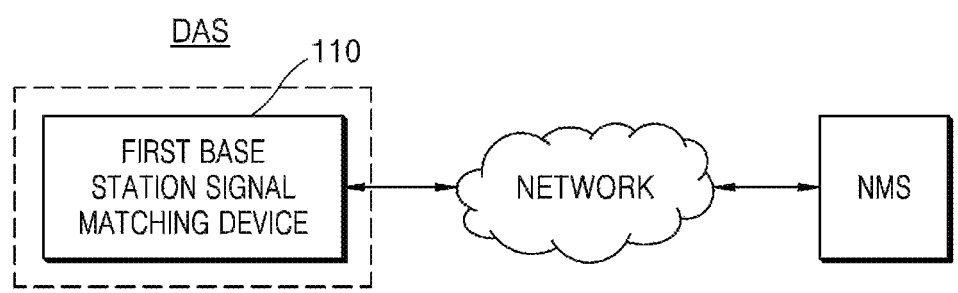
FIG. 4 is a block diagram of connection between a distributed antenna system and a network management system to which a base station signal matching device may be applied, according to an embodiment of the present invention.

FIG. 4 is a block diagram of connection between a distributed antenna system and a network management system to which a base station signal matching device may be applied, according to an embodiment of the present invention.

Referring to FIG. 4, the distributed antenna system DAS may be connected to an external management system, for example, a network management server or system (NMS), via a network.

Accordingly, an administrator may remotely monitor the state and problem of each node of the distributed antenna system DAS through the NMS, and may remotely control the operation of each node.

In the base station signal matching device according to an embodiment of the present invention, for example, the first base station signal matching device 110 may receive and process a base station signal or a terminal signal for all frequency bands (or all service providers or all sectors), so that the first base station signal matching device 110, which is connected to the NMS, may transmit various information for monitoring, analysis and/or diagnosis to the NMS and may be remotely controlled by the NMS. As a result, a load of the main unit 20 at the rear end may be reduced, and a monitoring range for the distributed antenna system DAS may be extended.

Figure 5:
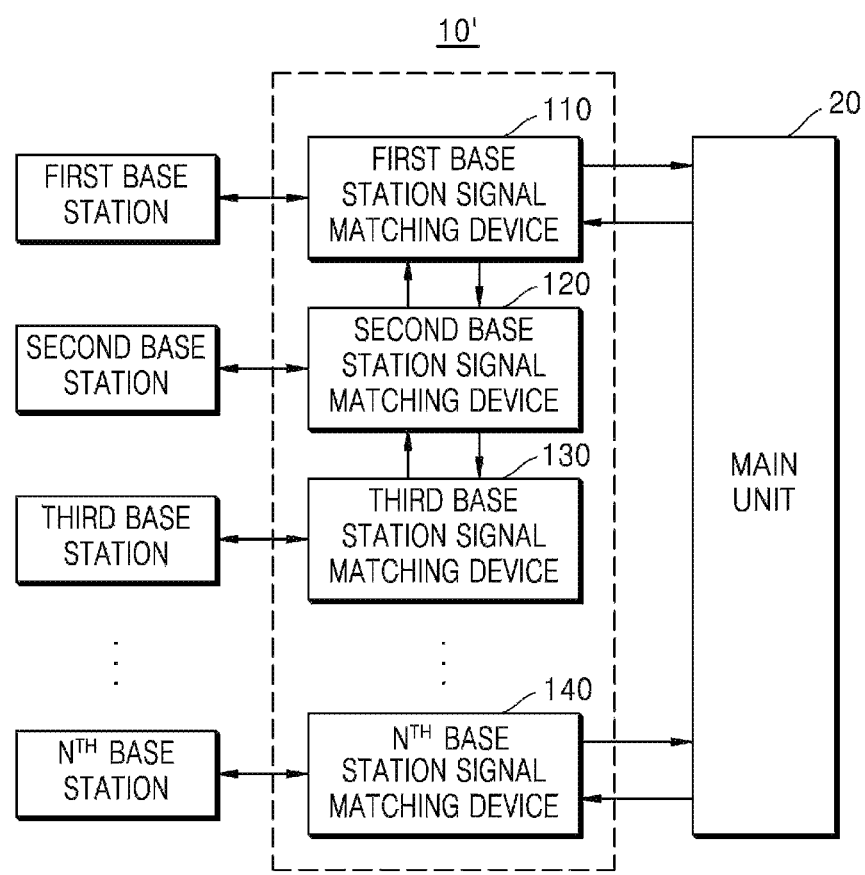
FIG. 5 is a block diagram of a modification of a configuration of a base station interface unit shown in FIG. 1.

FIG. 5 is a block diagram of a modification of a configuration of the base station interface unit shown in FIG. 1.

Referring to FIG. 5, a base station interface unit 10' may include first to n$^{th}$ base station signal matching devices 110, 120, 130, and 140 connected to corresponding base stations of first to n$^{th}$ base stations.

FIG. 5 shows that each of the first to n$^{th}$ base stations transmits a base station signal having a different service frequency band, and the first to n$^{th}$ base station signal matching devices 110, 120, 130, and 140 are respectively provided in the base station interface unit 10' corresponding to the first to n$^{th}$ base stations. However, as described above, each of the first to n$^{th}$ base station signal matching devices 110, 120, 130, and 140 may be provided in the base station interface unit 10' for each sector or each service provider.

Some base station signal matching devices 110, 120, and 130 of the first to n$^{th}$ base station signal matching devices 110, 120, 130, and 140 may be connected in series to the main unit 20 at the rear end, and the remaining base station signal matching device 140 may be connected in parallel to the main unit 20. FIG. 5 shows a case where one base station signal matching device 140 is connected directly to the main unit 20 without the second base station signal matching device 110 therebetween. However, a plurality of base station signal matching devices 140 may also be directly connected to the main unit 20.

Meanwhile, referring to FIGS. 1 to 5, a base station signal matching device according to an embodiment of the present invention is installed in a base station interface unit of a distributed antenna system, but the inventive concept is not limited thereto. The base station signal matching device according to an embodiment of the present invention may also be installed in various communication devices requiring an interface with other base stations.

While the embodiments have been particularly shown and described, it will be understood by one of ordinary skill in the art that various changes in form and details may be made therein without departing from the spirit and scope of the present invention as defined by the appended claims.

What is claimed is:

1. A base station signal matching device included in a distributed antenna system, comprising:
    a power level adjusting unit including a coupler and adjusting a power level of a first radio frequency (RF) type base station signal received from a first base station connected to the base station signal matching device;
    a signal matching unit, implemented by at least one attenuator, matching the power level adjusted first RF type base station signal to be suitable for signal processing of the distributed antenna system; and
    a signal processing unit, implemented by at least one processor, receiving the matched first RF type base station signal from the signal matching unit, receiving a matched second RF type base station signal from a first other base station signal matching device directly connected to the base station signal matching device, and generating a combined signal by combining the matched RF type first base station signal with the matched second RF type base station signal,
    wherein the base station signal matching device and the first other base station signal matching device are connected in series with a main unit which transmits the combined signal to at least one remote unit of the distributed antenna system,
    wherein the signal processing unit is configured to:
    when the base station signal matching device is directly connected to the main unit, transmit the combined signal to the main unit, and
    when the base station signal matching device is not directly connected to the main unit, transmit the combined signal to a second other base station signal matching device which is connected in series with the base station signal matching device and the main unit, and
    wherein the first other base station signal matching device is connected to a second base station different to the first base station, and the second other base station signal matching device is connected to a third base station different from the first base station and the second base station.

2. The base station signal matching device of claim 1, wherein the signal processing unit is connected to an external management system via a network.

3. The base station signal matching device of claim 1, wherein the base station signal matching device is included in a base station interface unit.

4. A distributed antenna system comprising:
    a main unit;
    at least one remote unit; and
    a plurality of base station signal matching devices connected in series with each other, wherein only one of the plurality of base station signal matching devices is connected to the main unit, wherein the one of the plurality of base station signal matching devices comprise:

a power level adjusting unit including a coupler and adjusting a power level of a first RF type base station signal received from a first base station;

a signal matching unit, implemented by at least one attenuator, matching the power level adjusted first RF type base station signal to be suitable for signal processing of the distributed antenna system; and a signal processing unit, implemented by at least one processor, receiving the matched first RF type base station signal from the signal matching unit, receiving a matched second RF type base station signal from a first other base station signal matching device, generating a combined signal by combining the matched first RF type base station signal with the matched second RF type base station signal, and transmitting the combines signal to the main unit, wherein the main unit transmits the combined signal to the remote unit, and wherein the signal processing unit is configured to:

when the one of the plurality of base station signal matching devices is directly connected to the main unit, transmit the combined signal to the main unit, and when the one of the plurality of base station signal matching devices is not directly connected to the main unit, transmit the combined signal to a second other base station signal matching device directly connected to the one of the plurality of base station signal matching devices, and wherein the first other base station signal matching device is connected to a second base station different to the first base station, and the second other base station matching device is connected to a third base station different from the first base station and the second base station.

5. A distributed antenna system comprising:

a main unit;

at least one remote unit;

a plurality of first base station signal matching devices connected in series with each other, wherein one of the plurality of first base station signal matching devices is connected to the main unit; and at least one second base station signal matching device connected to the main unit in parallel with the plurality of first base station signal matching devices, wherein the one of the plurality of first base station signal matching devices comprise:

a power level adjusting unit including a coupler and adjusting a power level of a first RF type base station signal received from a first base station;

a signal matching unit, implemented by at least one attenuator, matching the power level adjusted first RF type base station signal to be suitable for signal processing of the distributed antenna system; and a signal processing unit, implemented by at least one processor, receiving the matched first RF type base station signal from the signal matching unit, receiving another matched first RF type base station signal from a first other first base station signal matching device among the plurality of first base station signal matching devices, generating a combined signal by combining the matched first RF type base station signal with the other matched first RF type base station signal, and transmitting the combined signal to the main unit, wherein the main unit transmits the combined signal to the remote unit, and wherein the signal processing unit is configured to:

when the one of the plurality of first base station signal matching devices is directly connected to the main unit, transmit the combined base station signal to the main unit, and when the one of the plurality of first base station signal matching devices is not directly connected to the main unit, transmit the combined base station signal to a second other first base station signal matching device directly connected to the one of the plurality of first base station signal matching devices, and wherein the first other first base station signal matching device is connected to a second base station different to the first base station, and the second other first base station signal matching device is connected to a third base station different from the first base station and the second base station.

6. The distributed antenna system of claim 5, wherein the second base station signal matching device receives a second base station signal from a corresponding base station and matches the second base station signal to be suitable for signal processing of the distributed antenna system and transmits the matched second base station signal to the main unit.

\* \* \* \* \*